US012076764B2

(12) United States Patent
MacNeil et al.

(10) Patent No.: US 12,076,764 B2
(45) Date of Patent: Sep. 3, 2024

(54) TRACTOR TOWED INDEXING SYSTEM

(71) Applicant: Mac & Mac Hydrodemolition Inc., Surrey (CA)

(72) Inventors: Gerard J. MacNeil, Surrey (CA); Jesse MacNeil, Surrey (CA); Brett MacNeil, Surrey (CA); Gordon MacNeil, Surrey (CA); Vernon Bose, Surrey (CA)

(73) Assignee: Mac & Mac Hydrodemolition Inc., Surrey (CA)

( * ) Notice: Subject to any disclaimer, the term of this patent is extended or adjusted under 35 U.S.C. 154(b) by 405 days.

(21) Appl. No.: 17/203,661

(22) Filed: Mar. 16, 2021

(65) Prior Publication Data

US 2021/0291239 A1 Sep. 23, 2021

(30) Foreign Application Priority Data

Mar. 18, 2020 (CA) ...................................... 3076138

(51) Int. Cl.
*B08B 9/04* (2006.01)
*B08B 9/043* (2006.01)
*B08B 9/049* (2006.01)
*E03F 9/00* (2006.01)

(52) U.S. Cl.
CPC ............ *B08B 9/0433* (2013.01); *B08B 9/049* (2013.01); *E03F 9/00* (2013.01)

(58) Field of Classification Search
CPC ....... B08B 9/0433; B08B 9/049; B08B 9/051; B08B 9/04; B08B 9/043; B08B 9/045; B08B 9/047; B08B 2209/04; B08B 2209/027; E03F 9/00
See application file for complete search history.

(56) References Cited

U.S. PATENT DOCUMENTS 3,557,928 A * 1/1971 Cromwell, Sr. ........ G07F 17/22 15/31
3,576,582 A * 4/1971 Smith, Jr. ................ G01D 9/34 346/61
5,091,016 A * 2/1992 Krajicek ............... B08B 9/0936 134/22.18

(Continued)

FOREIGN PATENT DOCUMENTS

CA 2412691 A1 5/2004
CA 2671156 A1 3/2009

(Continued)

*Primary Examiner* — Joseph L. Perrin
*Assistant Examiner* — Irina Graf
(74) *Attorney, Agent, or Firm* — Stoel Rives LLP

(57) ABSTRACT

An apparatus and method for scarifying the interior surface of pipes, such as a sewer pipe, the apparatus including a chassis, a carriage coupled to the chassis to reciprocate along a longitudinal axis of the chassis, a shaft capable of indexing rotation coupled to the carriage, and arms extending radially from the indexing shaft and tipped in high-pressure nozzle assemblies. The method includes positioning the apparatus in a pipe and alternately reciprocating the carriage and indexing the shaft so as to scarify successive longitudinal swathes of the pipe surface until the desired circumference of the pipe section is scarified. The apparatus is then repositioned in the next section of pipe and the method is repeated until the desired length of pipe is scarified. The apparatus may further include a separable propulsion unit.

9 Claims, 8 Drawing Sheets

(56) References Cited

U.S. PATENT DOCUMENTS

| | | | | | |
|---|---|---|---|---|---|
| 5,282,575 | A * | 2/1994 | Krulick | B05B 13/0415 239/263.1 |
| 5,405,086 | A * | 4/1995 | Kranzle | B05B 15/62 239/310 |
| 5,571,977 | A * | 11/1996 | Kipp | G01M 3/38 73/865.8 |
| 6,206,016 | B1 | 3/2001 | MacNeil et al. | |
| 6,390,105 | B1 * | 5/2002 | Ramsey | B08B 9/0433 134/167 C |
| RE44,518 | E | 10/2013 | MacNeil et al. | |
| 10,781,563 | B2 | 9/2020 | MacNeil et al. | |
| 11,155,245 | B2 * | 10/2021 | Detrick | B08B 1/002 |
| 11,246,318 | B1 * | 2/2022 | Bullard | A23L 3/3589 |
| 11,344,932 | B2 * | 5/2022 | He | B08B 1/001 |
| 11,551,920 | B2 * | 1/2023 | Furuta | H01J 49/0418 |

FOREIGN PATENT DOCUMENTS

| | | | | |
|---|---|---|---|---|
| CA | 2412693 | C | 3/2010 | |
| CA | 2689767 | A1 | 8/2010 | |
| CA | 2485819 | C | 7/2011 | |
| CA | 2585903 | C | 3/2012 | |
| CA | 2302083 | C * | 5/2012 | B05B 13/0636 |
| CA | 2730790 | C | 11/2015 | |
| CA | 2858738 | A1 | 1/2016 | |
| CA | 2812334 | C | 1/2018 | |
| CA | 2755007 | C | 1/2019 | |
| DE | 29802660 | U1 * | 5/1998 | E03F 9/00 |
| MX | 2009002025 | A | 8/2010 | |

* cited by examiner

FIG. 3
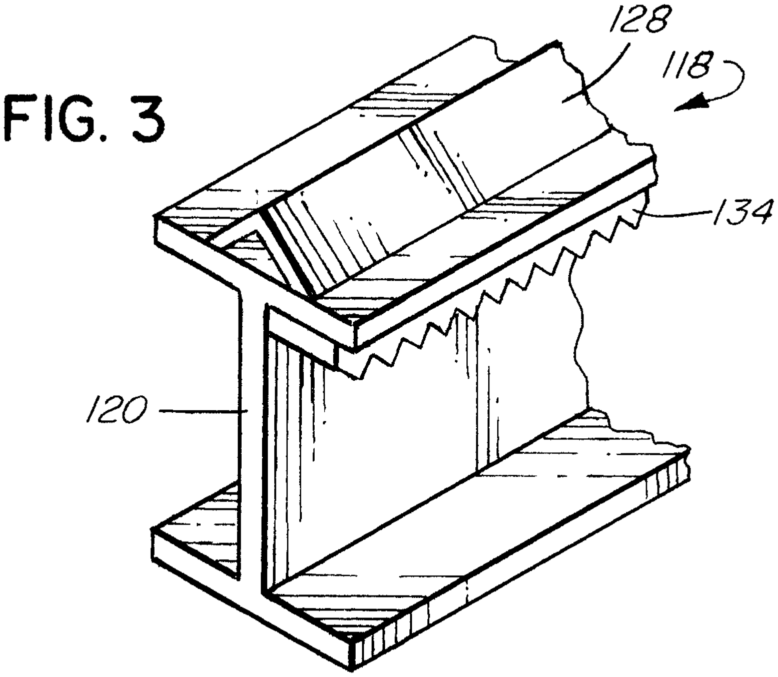
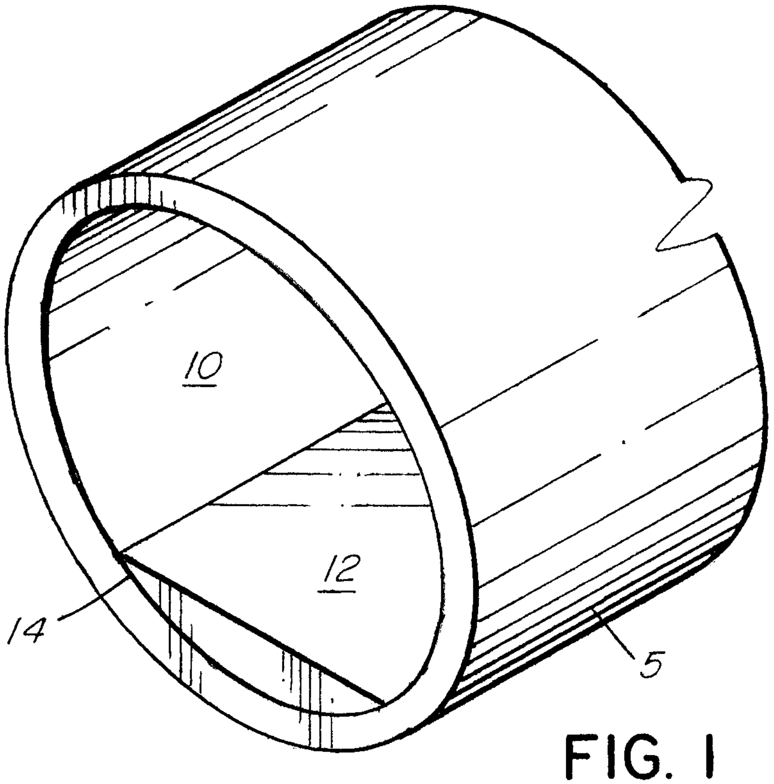
FIG. 1

TRACTOR TOWED INDEXING SYSTEM

FIELD OF THE INVENTION

This invention relates to hydrodemolition. In particular, this invention relates to a method and apparatus for the hydroscarification of the interior surface of pipes such as sewer pipes.

BACKGROUND OF THE INVENTION

Many pipes used to transport various fluids are degraded by those fluids over time. For example, the interior surface of sewer pipes may be corroded over time by sulfuric acid produced by bacteria in the effluent. Pipes may have a sealant layer to protect against degradation, but this sealant layer may also degrade over time and require periodic reapplication. Usually, the fresh sealant layer cannot be applied directly to the degraded pipe surface. The degraded layer must be removed first to expose clean pipe material. One way to remove this layer is with jets of high-pressure fluid. This process is referred to as scarification.

Pipe scarification is routinely done in situ. As the pipes generally cannot be used during the scarification process, it is desirable to complete the scarification process as rapidly and efficiently as possible. For example, sewer pipes normally cannot be taken fully offline, and so scarification must be conducted at night while the pipes are at the minimum flow level.

It is known that automating the scarifying process will be more efficient than a partially or fully manual scarification process. As pipes are usually cylindrical, auotomation may be accomplished by rotating scarification nozzles around the centre axis of the pipe. For example, U.S. Pat. No. RE44,518 to MacNeil et al. discloses one embodiment of a scarifying apparatus in which several nozzle arms are attached to a rotating fluid exchanger mounted to the front of a vehicle. As the vehicle slowly advances down the pipe, the arms scarify the pipe in a helical pattern. However, if the vehicle advances too quickly, portions of the pipe will be left unscarified in a pattern resembling a barber's pole. Therefore, it is more advantageous to alternate rotation of the nozzles with reciprocating horizontal motion to better ensure full scarification.

A simple way to enable automation is to use a stationary frame such as that of the apparatus disclosed in Canadian Patent No. 2,412,693, also to MacNeil et al. The dimensions of the stationary frame are fixed and known from the outset, so the scarification process for a given pipe section corresponding to the length of the frame can be automated using simple devices such as limit switches and the like. When the pipe section has been completely scarified, the frame may be moved to the next pipe section requiring treatment by means of self-propulsion, or by a separable tractor unit such as that disclosed in Canadian Patent No. 2,689,767 to MacNeil et al.

In contrast, the scarifier apparatus disclosed in Canadian Patent No. 2,412,691 to MacNeil et al. must be driven back and forth through a given pipe section. To ensure that each back and forth pass of the given pipe section is the same length requires either the use of sensors and potentially computerized control to automate the process or more manual control over the scarifier. As pipe scarification is routinely done in situ, it is desirable that scarifying apparatus are robust and rugged. Less complex components are easier and less expensive to ruggedize, making a stationary frame scarifier more desirable.

However, as the dimensions of the frame are fixed, any given stationary frame scarifier known in the art can only be used to scarify a small range of pipe sizes. Scarifying pipes outside of that range requires a different size of scarifier.

Further, the frame will generally limit the extent to which rotational motion can be utilized to aid in automation. The rotating fluid exchanger disclosed in RE44,518 could not be used with a stationary frame, since the arms would be prevented from rotating the full 360 degrees by elements of the frame.

It is therefore an object of the present invention to provide a stationary scarification apparatus which can accommodate a wider range of pipe sizes It is a further object of the invention to provide a simple, automated stationary scarification apparatus that can more advantageously utilize rotational motion.

These and other objects will be better understood by reference to this application as a whole. Not all of the objects are necessarily met by all embodiments of the invention described below or by the invention defined by each of the claims.

SUMMARY OF THE INVENTION

In one aspect, the invention comprises a scarifier for scarifying an interior wall of a pipe that includes an elongate chassis having transversely spaced horizontal rails or tracks. A carriage is mounted for reciprocation along the tracks. A rotatable shaft capable of reversibly indexing rotation is coupled to the carriage. A pair of arms extends radially in different directions from the indexing shaft. The arms are preferably extendible. The arms may be a variety of shapes, with each shape being more appropriate for a given pipe diameter. For example, the arms used in small-diameter pipes may have an offset midsection so that each arm will not enter into contact with the tracks as it is rotated below the horizontal. Each arm is tipped with at least one high-pressure fluid nozzle to direct a jet of fluid against the interior surface. Preferably, a set of wheels is mounted to ends of the elongate chassis. Said wheels may extend or retract such that the chassis height may be raised or lowered to optimally position the rotational axis of the indexing shaft.

In another aspect, the invention comprises a method for using the above scarifier, wherein first the chassis is propelled into a section of pipe to be treated, preferably using a separable tractor unit. Next, the wheels are extended or retracted so as to bring the rotational axis of the indexing shaft substantially into alignment with the center axis of the pipe. Then the arms are extended to bring the nozzle assemblies into operational proximity with the pipe wall and the shaft is rotated so that one nozzle assembly points near the base of the pipe and the opposing nozzle assembly points near the apex of the pipe. The nozzles emit high pressure fluid jets to begin scarifying the pipe. The carrier is then operated to traverse longitudinally on the chassis. Once it reaches the far end, the indexing shaft is rotated to point the nozzles at the next adjacent swath of pipe, and the carrier is operated to return to the starting side. These steps repeat until the full length of the pipe section is scarified.

In another aspect of the invention, an apparatus for scarifying an interior surface of a pipe comprises an elongate frame, rails fixed on the frame, and a carriage mounted for reciprocation on the rails along a longitudinal axis of the elongate frame, the carriage comprising a carriage frame, a shaft coupled to the carriage frame, the shaft capable of indexing rotation, and at least one pair of arms extending substantially radially from the indexing shaft, the pair of arms substantially mirror-symmetric about a plane bisecting the shaft longitudinally, wherein each arm terminates in at least one nozzle, the nozzle operative to direct a high-pressure jet of fluid against the interior surface.

In a further aspect, the arms extend transversely relative to the elongate frame.

In another further aspect, the arms are substantially sickle-shaped to permit the arms to rotate to point below a horizontal midplane of the pipe without contacting the rails or the frame.

In another further aspect, the arms are extendible.

In another further aspect, the apparatus further comprises vertically extendible supports attached to the elongate frame.

In a still further aspect, the supports are attached to a first end and a second end of the elongate frame.

In yet a still further aspect, the supports comprise two wheels, a support axle connecting the wheels, at least one hinged member fixed to the support axle and pivotally coupled to the elongate frame, and at least one linear actuator connecting the support axle to the elongate frame to extend and retract the support.

In another aspect, a method for scarifying an interior surface of a pipe section comprises providing a scarification apparatus having an elongate frame, supports which can raise and lower the frame, a track fixed on top of the frame, a carriage mounted for reciprocation on the track along a longitudinal axis of the frame, a shaft coupled to the top of the carriage, the shaft capable of indexing rotation, two extendible arms extending radially from the shaft, the arms substantially mirror-symmetric about a plane bisecting the shaft longitudinally, the arms terminating in nozzle assemblies operative to direct fluid jets at the interior surface, positioning the apparatus inside of said pipe section, raising or lowering the frame on the supports so that an axis of rotation of the indexing shaft is substantially collinear with a center axis of the pipe, extending the arms to bring the nozzle assemblies into close proximity with the interior surface, emitting fluid jets from the nozzle assemblies, causing the carriage to traverse along the track from an end of the frame to another end of the frame, thereby scarifying two longitudinal swathes of the interior surface, indexing the shaft to point the nozzle assemblies at next adjacent swathes of the interior surface, and alternately reciprocating the carriage and indexing the shaft until substantially all of the pipe section is scarified.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIG. 1 is a perspective view of a section of an exemplary sewer pipe;

FIG. 3 is a detail perspective view of a section of the track assembly of the apparatus;

FIGS. *8a* and *8b* are detailed side views of the preferred embodiment of the chassis supports, indicating how the supports raise and lower the chassis;

FIGS. *9a* and *9b* are perspective views of the apparatus situated within the sewer pipe, indicating the method whereby the carriage reciprocation and the shaft indexing alternate to scarify circumferentially adjacent swathes of the pipe surface.

DETAILED DESCRIPTION OF AT LEAST ONE MODE FOR CARRYING OUT THE INVENTION IN TERMS OF EXAMPLE(S)

Figure 2:
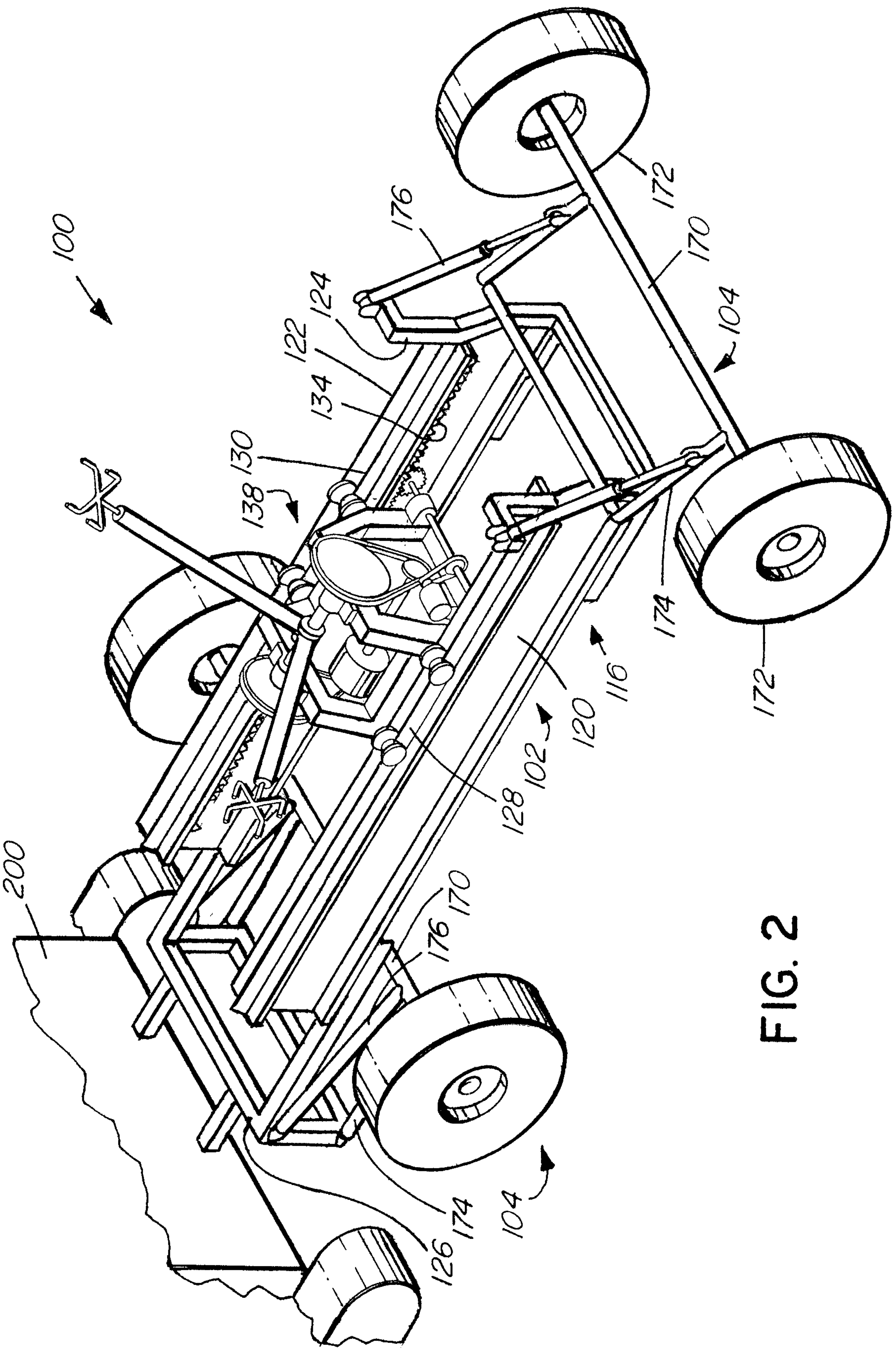
FIG. 2 is a perspective view of the apparatus according to the preferred embodiment.

Referring to FIG. 1, A surface to be scarified may be an interior surface 10 of a pipe 5. A false floor 12 may be layered over a minimum flow mark 14, and scarification may be performed on the interior surface 10 above the false floor 12. Referring to FIG. 2, a scarifier 100 for scarifying the surface 10 comprises a chassis 102 and a plurality of wheeled supports 104 located on the periphery of the chassis 102. The wheeled supports 104 contact the interior surface 10 of the pipe 5, or the false floor 12 where used, and hold the chassis 102 above the bottom of the pipe 5. The wheeled supports 104 preferably can extend and retract, thereby raising and lowering the height of the chassis 102.

The chassis 102 comprises a frame 116 and a track assembly 118 fixed to the frame 116. The frame 116 is preferably rectangular in shape and comprises two spaced apart elongate side members 120, 122 with a front cross member 124 and a rear cross member 126 fixed to and extending between the side members 120, 122.

Preferably, a wheeled support 104 is connected to each of the front and rear cross members 124, 126. Each wheeled support 104 preferably comprises an axle member 170 extending between two wheels 172. At least one swing member 174 extends radially from the axle member 170 and is pivotally coupled to the respective cross member. At least one linear actuator 176 is pivotally coupled to both the swing member 174 and the respective cross member. The linear actuators 176 are preferably double-acting hydraulic cylinders.

Referring to FIGS. 2 and 3, the track assembly 118 comprises a pair of spaced apart rails 128, 130, with each rail mounted on top of the respective elongate side member 120, 122. The rails 128, 130 preferably extend for substantially the entire length of the frame 116. The rails 128, 130 are preferably triangular in cross section. The track assembly further comprises at least one rack gear 134 fixed to either elongate side member 120 or 122, but preferably two rack gears fixed to each of the elongate side members 120, 122.

Figure 4:
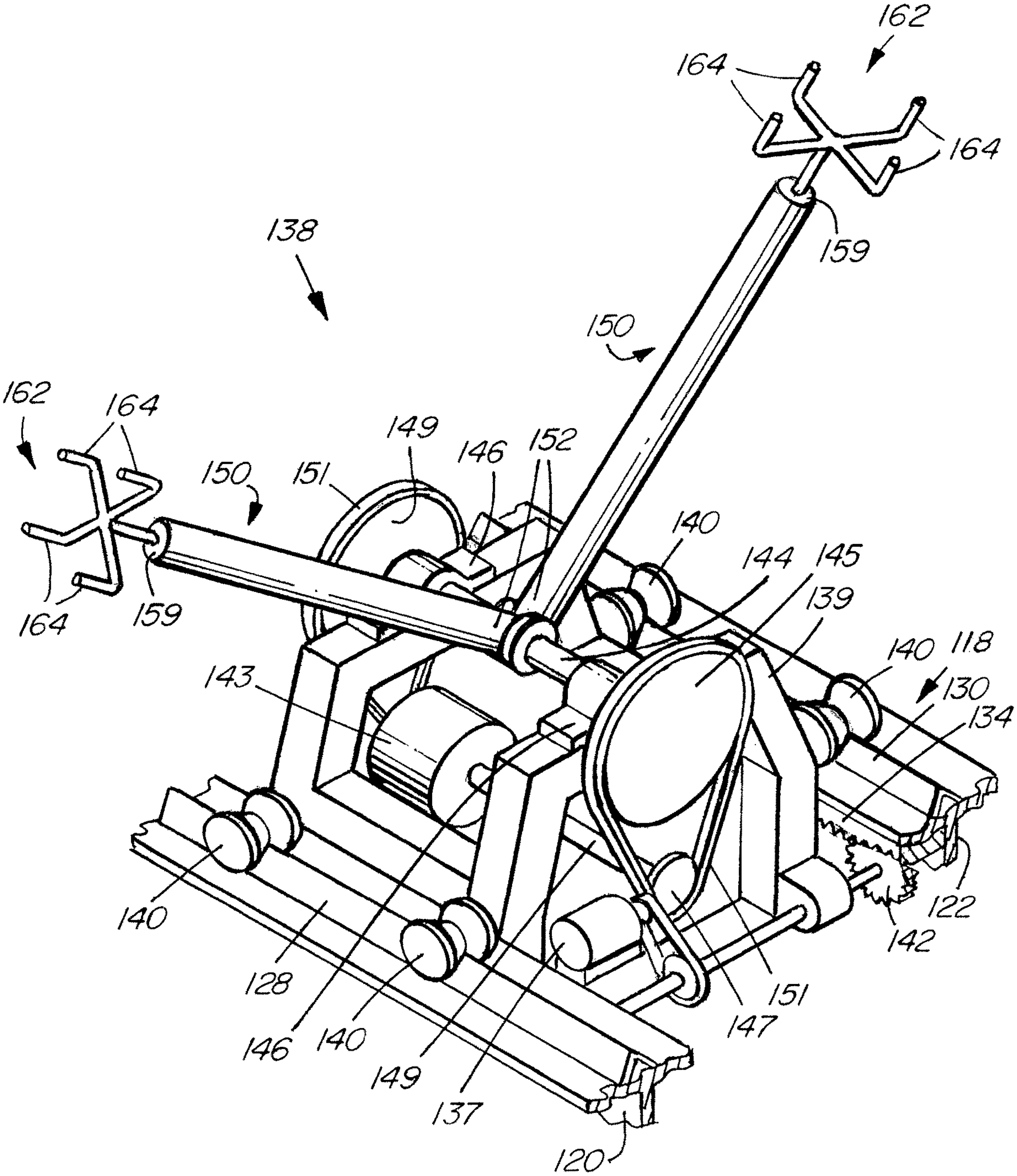
FIG. 4 is a perspective view of the carriage component of the apparatus.

Referring to FIG. 4, the track assembly 118 supports and guides a carriage 138. The carriage 138 comprises a carriage frame 139, one or more pairs of sheave wheels 140 located on opposing sides of the carriage 138, and at least one pinion gear 142 (only one is visible in FIG. 4) located on the underside of the carriage frame 139. Each sheave wheel in the pair 140 straddles its respective rail. The pinion gear or gears 142 are meshed to respective rack gears 134 and are powered by a drive mechanism 137, which may be a hydraulic motor. When the drive mechanism 137 rotates the pinion gears 142, the carriage 138 will longitudinally traverse the chassis 102 on the track assembly 118. The sheave wheels 140 provide a rolling (and therefore low-resistance) support for the weight of the carriage 138 on the rails 128, 130. The sheave wheels 140 in combination with triangular shape of the rails 128, 130 also help to prevent the carriage 138 from being derailed by uneven lateral forces exerted on the carriage 138 during the scarification operation (see below). Hydraulic lines, cables, or the like necessary to power the drive mechanism 137, as well as other systems discussed below, have been omitted from the figures for visual clarity.

An indexing shaft 144 is coupled to the top of carriage frame 139 by bearing blocks 146. Index sprockets 145 are fixed to the indexing shaft 144. The indexing sprockets are coupled to motor sprockets 147 (only one visible in FIG. 4) on motor shaft 149 by chains 151. The motor shaft 149 is driven by a stepper motor 143. Through this configuration, the indexing shaft 144, as the name suggests, is capable of indexing rotation, or rotating precisely through predefined angular increments. The stepper motor 143 may be capable of quite fine angular movement, often on the order of movement through 2 degrees or less. This slight movement can be geared up to cover the necessary arclength of the pipe surface 10 through the gear ratio between the indexing sprockets 145 and the motor sprockets 147. Advantageously, the gear ratio between indexing sprockets 145 and motor sprockets 147 may be altered by selecting one or both from a range of sizes, thereby altering the angular increments indexed by the indexing shaft 144.

A pair of arms 150 extends substantially radially from the indexing shaft 144. A base 152 of each arm 150 is preferably fixed to the midpoint of the indexing shaft 144. The pair of arms 150 are preferably substantially mirror symmetric about a plane bisecting the indexing shaft 144 longitudinally.

A nozzle assembly 162 is attached to a distal end 159 of the arm 150. The nozzle assembly 162 may comprise a single fluid nozzle 164 but preferably comprises a plurality of fluid nozzles 164 arrayed around a central axis. The nozzles 164 are capable of rotatory or oscillatory motion about the central axis.

At least one high pressure hose 168 (visible in FIG. 5) connects the nozzle assembly 162 to fluid tanks and high-pressure pumps located outside the pipe (not shown). The hose 168 delivers a high-pressure fluid, usually water, to each nozzle 164, and each nozzle 164 emits a jet of fluid to scarify the surface 10. The nozzle assembly 162 is capable of scarifying a fixed width of pipe surface 10 in one pass, dictated by the arrangement and type of the plurality of nozzles 164. The width will correspond to an arclength of the pipe surface 10. Since the scarifier 100 may be used with a variety of pipe diameters, the angle subtending this arclength may be larger or smaller, depending upon the diameter of the pipe 5 in question. For this reason, the indexing angle of the indexing shaft 144 should be variable as discussed above.

Figure 5:
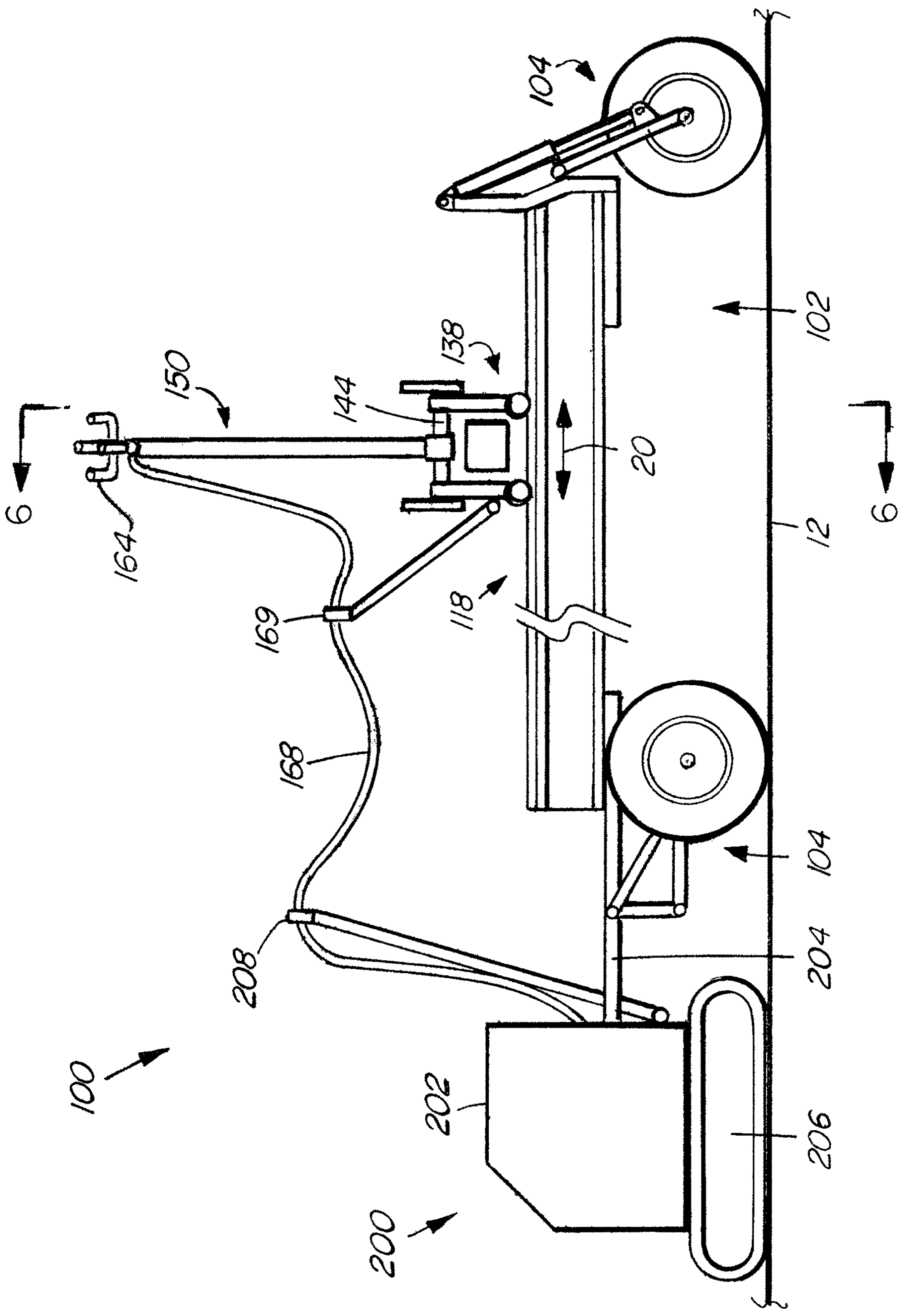
FIG. 5 is a side view of the apparatus, showing the optional tractor component, the high-pressure hose-management features, and indicating the reciprocating movement of the carriage component.

Referring, to FIGS. 4 and 5, when drive mechanism 137 rotates the pinion gears 142, the carriage 138 reciprocates on the track assembly 118, as indicated by double-headed arrow 20.

The scarifier 100 is preferably used with a separable tractor 200. The tractor 200 preferably comprises a tractor chassis 202 connected to a scarifier coupler 204. The scarifier coupler connects the scarifier chassis 102 to the tractor chassis 202 securely but reversibly. The tractor chassis 202 includes a locomotion mechanism 206 capable of driving both the tractor chassis and the scarifier 100. The locomotion mechanism preferably comprises two endless track drives, but other methods of propulsion may also be suitable.

A control board (not shown) is fixed to the tractor chassis 202. The control board comprises various control mechanisms for the functioning of both the tractor vehicle 200 and the scarifier 100. The control board may also have controls for running various pre-programmed automated scarifying routines. The control board is positioned so that an operator of the scarifier 100 is at least partially shielded from the hazards posed by the high-pressure jets emitted from the nozzles. The tractor vehicle 200 may also comprise shields or an operator cabin to more fully protect the operator.

The tractor vehicle may further comprise a high-pressure interchange (not shown but generally housed within the tractor chassis 202) which transfers the scarifying fluid from the surface hoses (not shown) to the high-pressure hoses 168. This arrangement relieves the arms 150 from tension which would arise if the arms were connected directly to the surface fluid supply. Additionally, the high-pressure hoses 168 only require enough slack to extend from the tractor vehicle to the front cross member 124 of the scarifier 100, making hose management relatively simple.

A carriage drawbar 169 is pivotally connected to the carriage 138. A tractor drawbar 208 is pivotally connected to the tractor chassis 202. As the carriage 138 reciprocates on the track assembly 118 towards the tractor 200, both the carriage drawbar 169 and the tractor drawbar 208 pivot upwards, raising the high-pressure hoses 168 up so that they do not interfere with the movement of the carriage 138.

The tractor vehicle may also comprise the hydraulic reservoirs, air compressors, or batteries, etc. necessary to run the various moving components of the scarifier 100. This reduces the number of surface lines needed to facilitate operation.

The tractor may comprise fluid tanks and high-pressure pumps, making the entire operation self-contained and subterranean. However, due to the rate of fluid consumption, the tanks must be quite large, which would be impractical to transfer into the pipe. Further, the high-pressure pumps are large, heavy, and consume a large amount of power, making the self-contained operation much more infeasible. Surface tanks and pumps are preferable.

Figure 6:
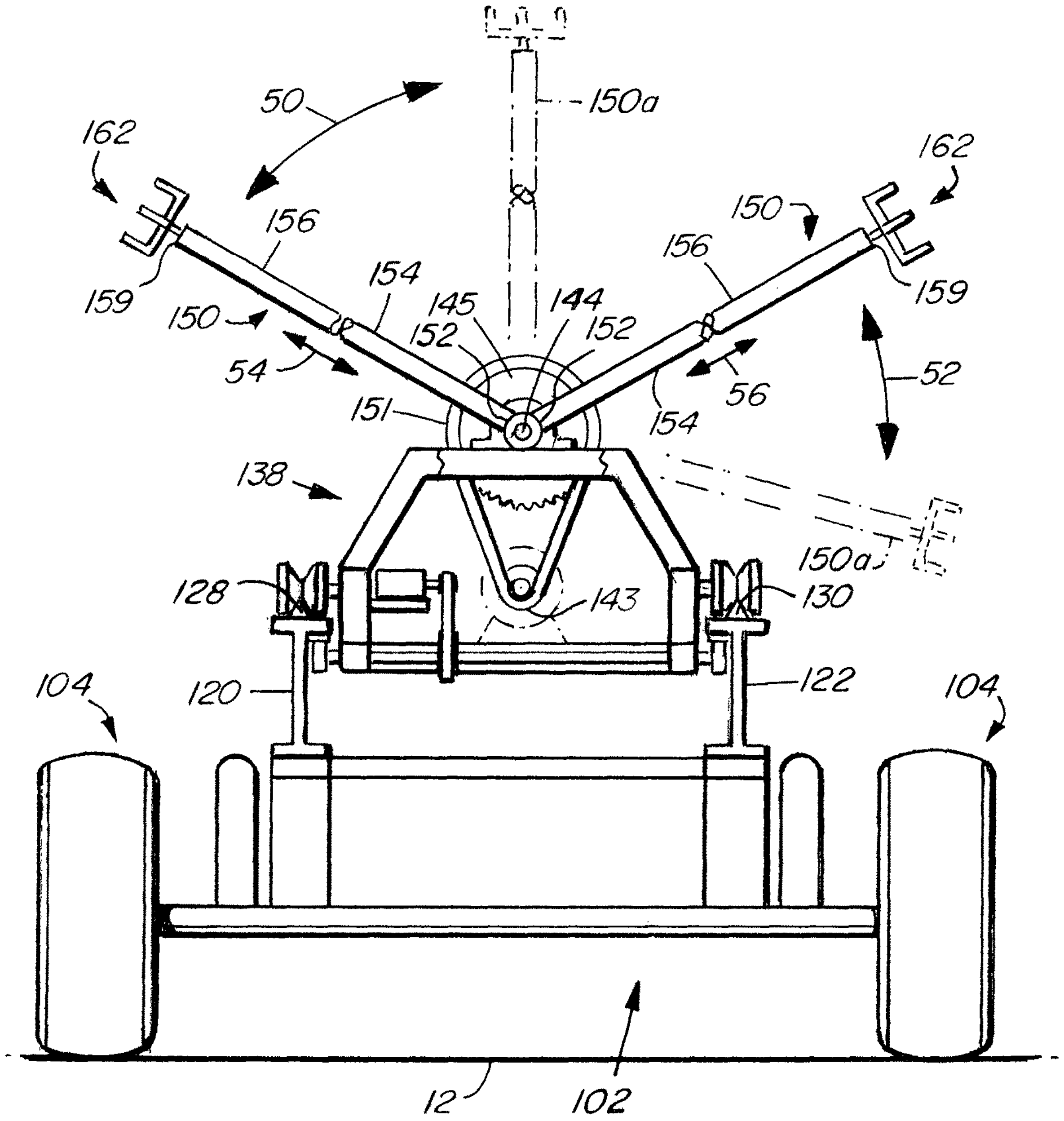
FIG. 6 is a front view of the apparatus, sectioned along line 6-6 of FIG. 5, indicating the arm extension and indexing shaft rotation.

Referring to FIG. 6, the indexing shaft 144 can index in either direction as indicated by arrows 50, 52. As the shaft indexes, the arms 150 move from one exemplary position, indicated by the arms 150 in solid outline in FIG. 6, to another, indicated by the arms 150*a* in broken outline in FIG. 6.

The arms 150 are preferably divisible into a proximal section 154 and a distal section 156. The proximal section 154 and distal section 156 are preferably formed from two different sizes of tubing such that the smaller size of tubing fits telescopically inside the larger tubing. The distal section 156 may then preferably be telescopically extendible with respect to the proximal section 154 as indicated by arrows 54, 56 in FIG. 6. The telescoping arms 150 can extend and retract to adjust to a wide range of pipe diameters.

Figure 7:
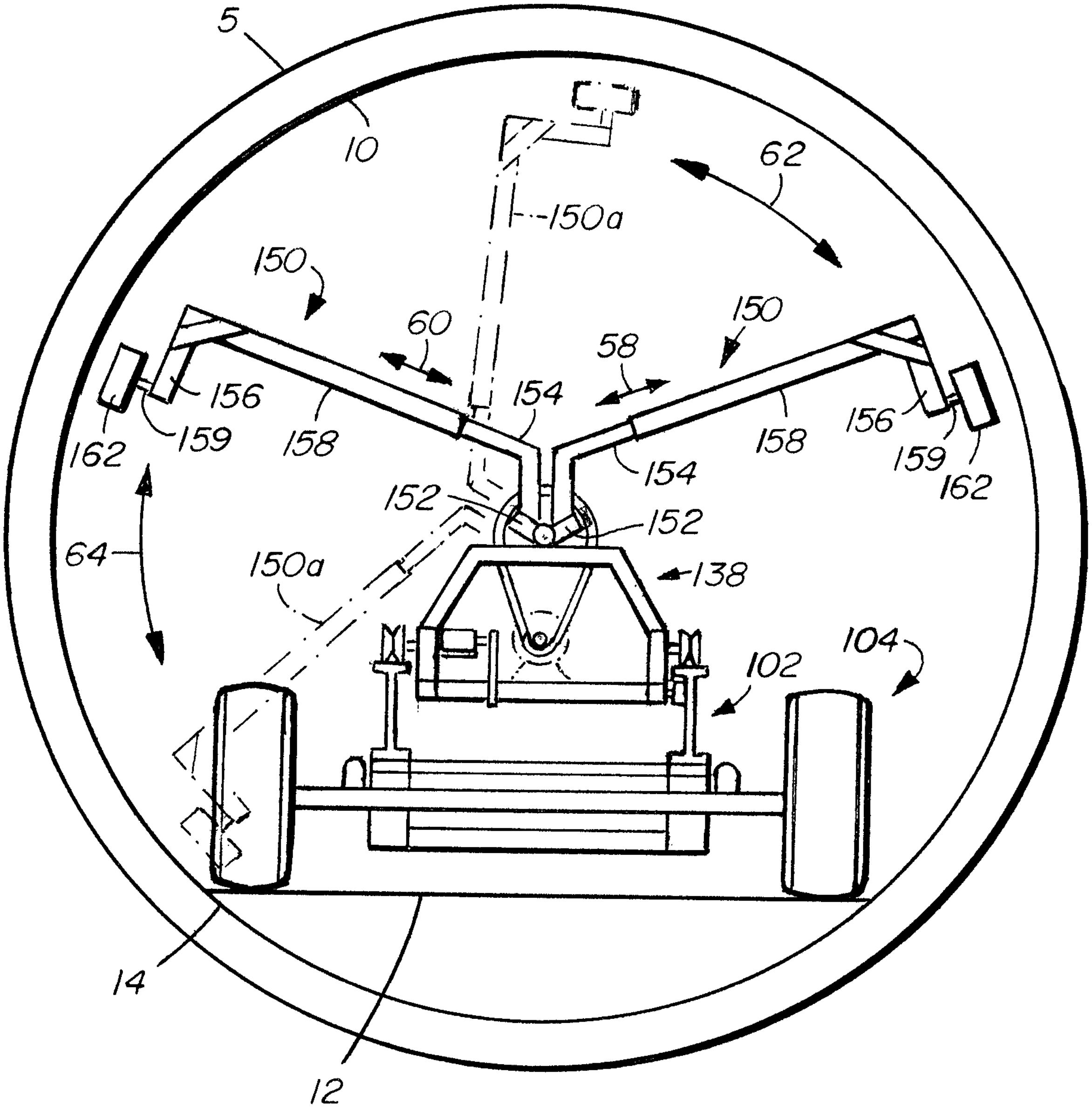
FIG. 7 is a front view of an alternate embodiment of apparatus, sectioned along line 6-6 of FIG. 5, situated within the sewer pipe and featuring substantially sickle-shaped arms intended for use in smaller diameter pipes.

Referring to FIG. 7, the arms 150 may come in a variety of shapes, with each different shape being advantageous for a particular pipe 5. In the embodiment of the arms 150 shown in FIG. 7, the base 152 and the distal end 159 are preferably located substantially aligned with an axis extending radially from the indexing shaft 144. The arms 150 have an offset midsection 158 that is preferably offset from this axis. this embodiment of the arms 150 is preferably telescopically extendible, with the telescoping preferably occurring in the offset midsection 158 as indicated by arrows 58, 60. The offset midsection 158 allows the arms 150 to rotate on the indexing shaft 144, as indicated by arrows 62, 64, to point at a portion of the surface 10 located below the midplane of the pipe 5.

Without the offset midsection 158, the arms 150 would rotate into contact with the chassis 102 before being able to point substantially below the horizontal. The arms 150 may appear to be broadly sickle-shaped due to the offset midsection 158.

In another embodiment, rather than having an offset midsection 158, the arms are 150 are bent between the proximal section 154 and the distal section 156. In this embodiment, the distal section 156 is preferably telescopically extendible.

Figure 8A:
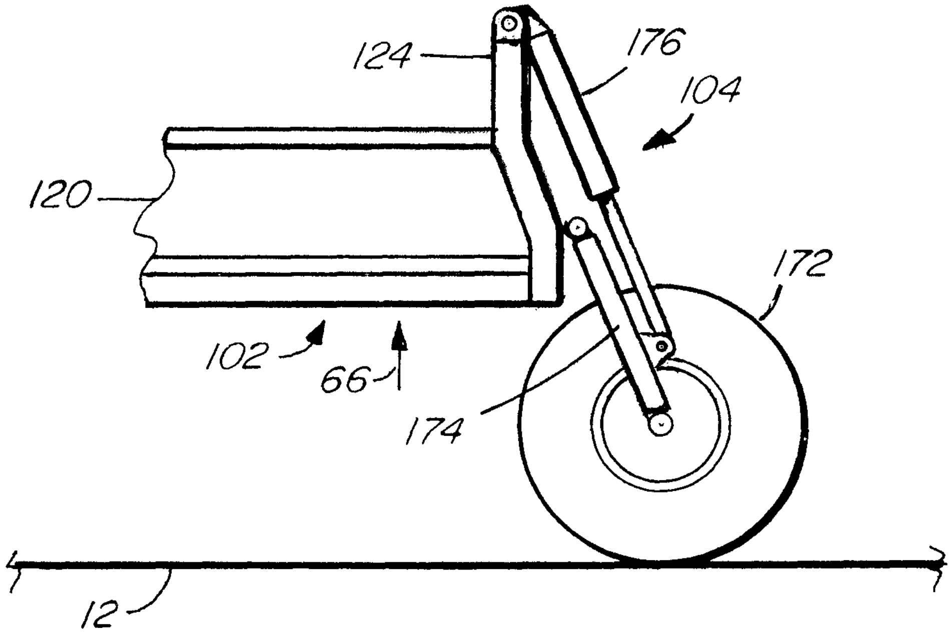
Figure 8B:
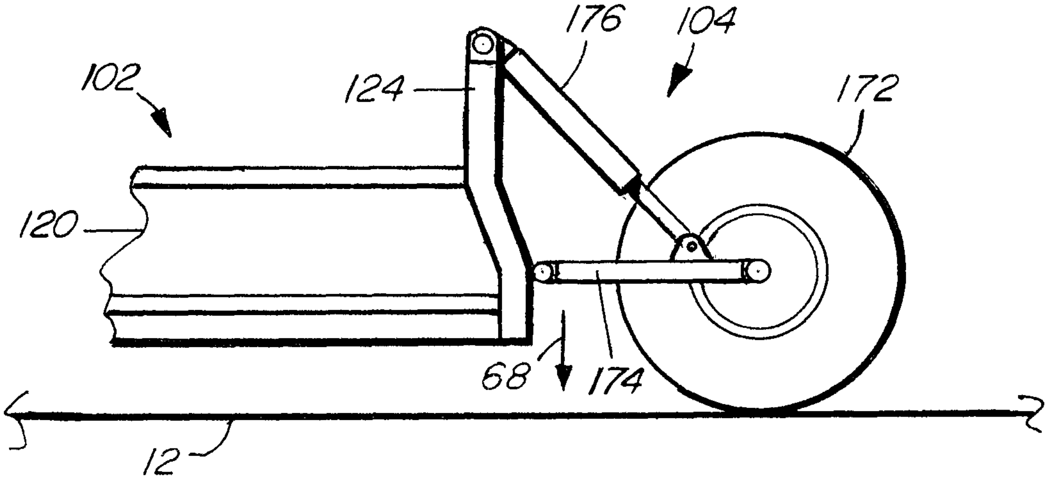

Referring to FIGS. 8*a* and 8*b*, extending or retracting each linear actuator 176 of the wheeled supports 104 raises or lowers the corresponding cross member of the chassis 102, as indicated by arrows 66 and 68. Simultaneous actuation of the front and rear linear actuators 176 will adjust the overall height of the chassis 102 and thereby the vertical position of rotation axis of the indexing shaft 144.

In use, the apparatus 100 is positioned within a pipe which requires scarifying. This is preferably accomplished by propulsion from the separable tractor vehicle 200, but may also be performed using an integral locomotion system such as continuous tracks or the like, incorporated into the chassis 102. Once positioned, the supports 104 should extend or retract accordingly to substantially align the rotation axis of the indexing shaft 144 with the centre axis of the pipe.

Figure 9A:
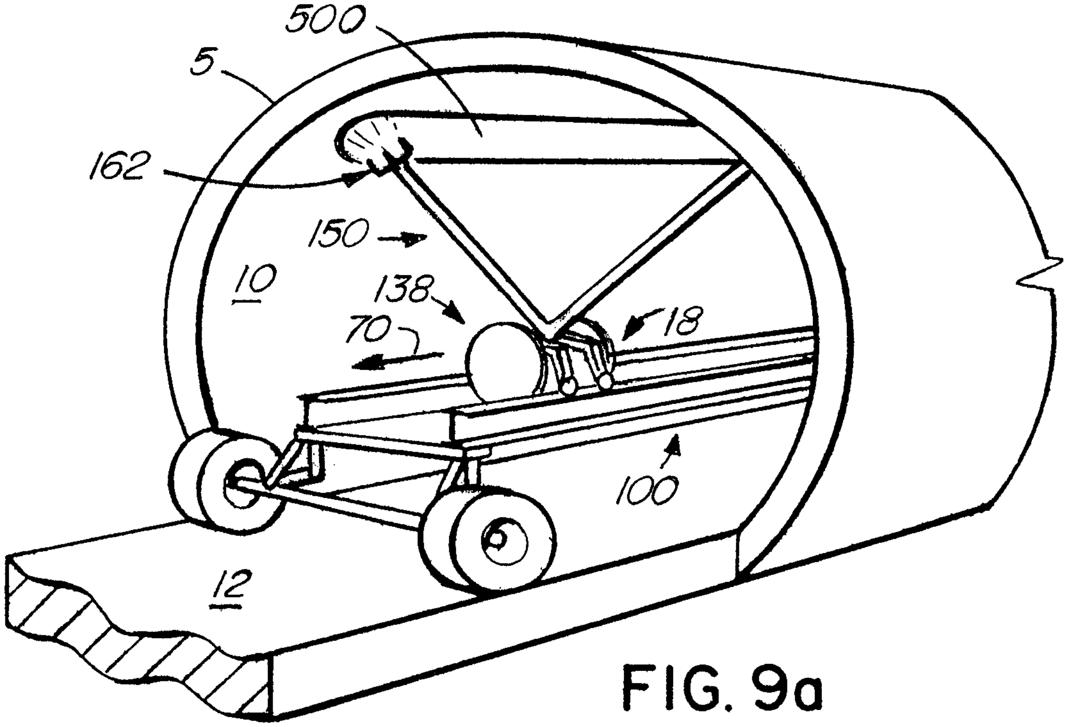
Figure 9B:
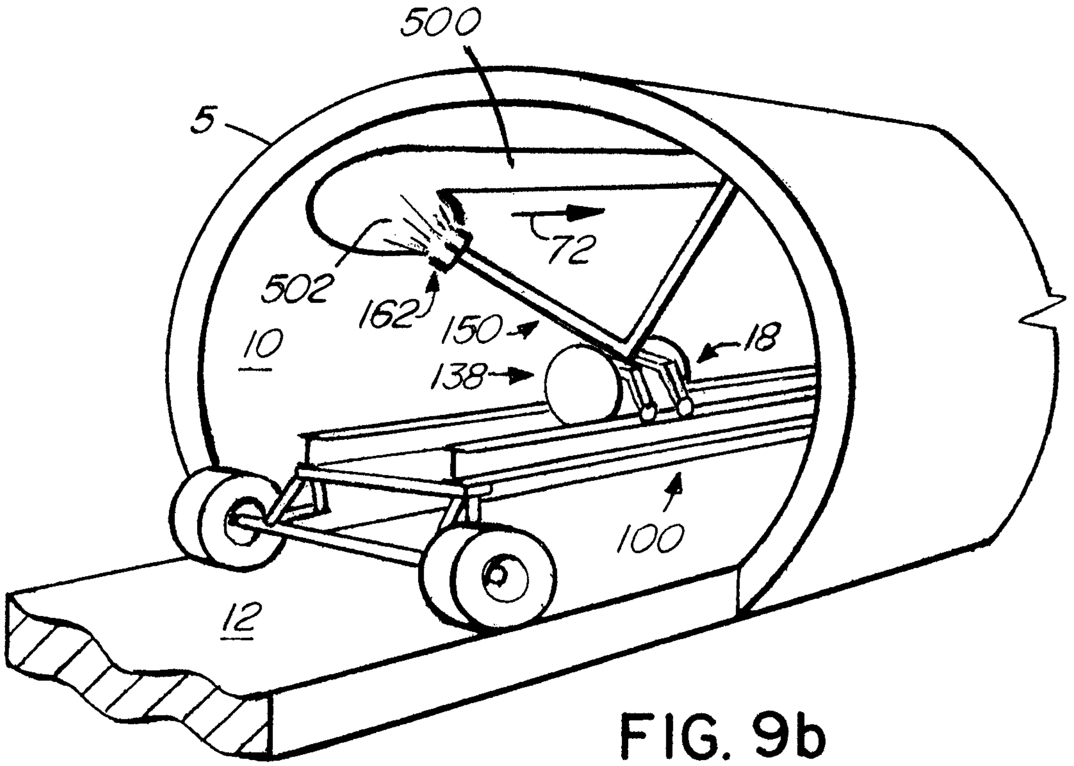

Referring to FIGS. 9*a* and 9*b*, the carriage 138 will preferably be initially located proximate to one end of the track assembly 118 and the arms 150 will preferably be initially oriented so that one nozzle assembly 162 is aimed proximate to the false floor 12. Next, the arms 150 are extended so as to bring the nozzle assemblies 162 into close proximity with the interior surface 10. The nozzle assemblies 162 can then emit a high-pressure fluid to begin scarifying the surface 10. As fluid is emitted, the carriage 138 traverses the chassis longitudinally on the track assembly 118, as indicated by arrow 70 in FIG. 9*a*. The traversal of the carriage 138 will cause the nozzle assemblies 162 to scarify two longitudinal swathes 500 (only one visible in FIGS. 9*a* and 9*b*) of the surface 10. When the carriage 138 reaches the periphery of the track assembly 118, the indexing shaft 144 will index to aim the nozzle assemblies 162 at the next adjacent swathes 502 (only one visible in FIG. 9*b*) to be scarified. The carriage 138 then returns to its starting location, as indicated by arrow 72 in FIG. 9*b* thereby scarifying the next adjacent swathes 502. The steps of shaft indexing and carriage traversal repeat until the entire section of pipe is scarified. The apparatus is then repositioned to the next section of pipe requiring scarification.

It can be appreciated from the foregoing method that the indexing angle should be set to subtend an arc slightly less than the width of the nozzle assembly 162 to ensure each longitudinal pass overlaps slightly, thereby preventing untreated longitudinal strips.

The above process may be easily automated. For example, the track assembly 118 may incorporate limit switches (not shown) on the periphery. When the carriage 138 contacts a limit switch, that switch sends a control signal stopping the carriage movement and causing the shaft 144 to index. Similarly, the rotation of the indexing shaft 144 may also trigger switches sending a control signal to the carriage 138 to travel along the track assembly 118 in the reverse direction.

It will be apparent from the foregoing that the apparatus 100 could use a single arm 150 instead of a pair. However, a single arm would require twice as many passes as a pair and would therefore be half as efficient. Further, using a pair of arms better balances the reaction forces on the carriage 138 created by emitting the high-pressure fluid.

It will also be apparent that 3 or more arms 150 could also be used instead of a pair for a commensurate increase in efficiency. The arms will still need to be substantially mirror-symmetric to ensure even coverage of the interior surface 10. This means that if an odd number of arms is chosen, one arm will be bisected by the plane of symmetry. However, additional arms add more weight which needs to be rotated by the shaft and moved by the carriage, which will require more robust and therefore more expensive structures and drive mechanisms. Accordingly, a pair of arms 150 has been found to be a viable balance between weight and efficiency.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. An apparatus for scarifying an interior surface of a pipe comprising:
- an elongate frame extending substantially horizontally;
- rails immovably mounted on said elongate frame; and
- a carriage mounted for reciprocation on said rails along a longitudinal axis of said elongate frame, said carriage comprising:
  - a carriage frame;
  - a shaft arranged substantially horizontally and coupled to said carriage frame, said shaft capable of indexing rotation; and
  - at least one pair of arms coupled to said shaft and extending substantially radially from said shaft, said pair of arms being substantially mirror-symmetric about a plane bisecting said shaft longitudinally, wherein each arm in said pair of arms:
    - terminates in at least one nozzle, said nozzle operative to direct a high-pressure jet of fluid against said interior surface of the pipe.

2. The apparatus of claim 1, wherein said pair of arms extend transversely relative to said elongate frame.

3. The apparatus of claim 2, said pair of arms being substantially sickle-shaped to permit said arms to rotate to a point below a horizontal midplane of said pipe without contacting said rails or said elongate frame.

4. The apparatus of claim 1, wherein a length of said pair of arms is adjustable.

5. The apparatus of claim 1, further comprising supports attached to said elongate frame, wherein said supports are configured to raise or lower said elongate frame in a substantially vertical direction.

6. The apparatus of claim 5, wherein said supports are attached to a front end and an opposite rear end of said elongate frame.

7. The apparatus of claim 5, wherein each support of said supports comprises two wheels configured to move said apparatus along said pipe, a support axle connecting said wheels, at least one hinged member fixed to said support axle and pivotally coupled to said elongate frame, and at least one linear actuator connecting said support axle to said elongate frame and configured to extend and retract to adjust a position of said elongate frame relative to said wheels.

8. The apparatus of claim 2, wherein a length of said pair of arms is adjustable.

9. The apparatus of claim 3, wherein a length of said pair of arms is adjustable.

* * * * *